United States Patent
Hamerski et al.

(10) Patent No.: US 6,541,089 B1
(45) Date of Patent: Apr. 1, 2003

(54) STRETCH RELEASING ADHESIVE TAPE WITH INTEGRAL PULL TAB

(75) Inventors: Michael D. Hamerski, Township of Baldwin, WI (US); Mark D. Sorlien, White Bear Lake, MN (US); Ronald C. Johansson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/382,384

(22) Filed: Aug. 24, 1999

(51) Int. Cl.[7] .................................................. C09J 7/02
(52) U.S. Cl. ..................... 428/40.1; 206/411; 428/41.8; 428/42.1; 428/42.2; 428/42.3; 428/43; 428/192; 428/194; 428/906
(58) Field of Search .............................. 428/40.1, 41.8, 428/41.9, 42.1, 42.2, 42.3, 43, 192, 194, 354, 906; 206/411

(56) References Cited

U.S. PATENT DOCUMENTS

| | | | |
|---|---|---|---|
| 3,997,702 A | * 12/1976 | Schurb | ......................... 428/352 |
| 4,024,312 A | 5/1977 | Korpman | |
| 4,472,480 A | 9/1984 | Olson | |
| 5,491,012 A | 2/1996 | Lühmann et al. | |
| 5,516,581 A | 5/1996 | Kreckel et al. | |
| 5,747,131 A | 5/1998 | Kreckel | |

FOREIGN PATENT DOCUMENTS

| | | |
|---|---|---|
| DE | 3331016 | 7/1992 |
| WO | WO 95/06691 | 3/1995 |
| WO | WO 98/06652 | 2/1998 |
| WO | WO 98/21285 | 5/1998 |
| WO | WO 99/31193 | 6/1999 |
| WO | WO 99/40159 | 8/1999 |

* cited by examiner

*Primary Examiner*—Nasser Ahmad
(74) *Attorney, Agent, or Firm*—David B. Patchett

(57) ABSTRACT

An elongated length of a single or double-sided stretch releasing adhesive tape that can be cut to a selected length with integral pull tabs for stretch removing the tape from a substrate. The stretch releasing adhesive tape can be provided as long strips or roll form. The elongated stretch releasing adhesive tape article includes an elongate length of stretch releasing adhesive tape defining a longitudinal axis. The stretch releasing adhesive tape has a first surface and a second non-adhesive surface. The first surface comprises one or more adhesive regions and one or more non-adhesive regions arranged along the longitudinal axis. At least a portion of the non-adhesive regions comprise a series of pull tabs arranged along the longitudinal axis that can be grasped in combination with the second non-adhesive surface by a user during stretch removal of the tape from an associated substrate.

13 Claims, 4 Drawing Sheets ically includes an elongate length of stretch releasing adhesive tape defining a longitudinal axis and including first and second surfaces. The first surface comprises one or more adhesive regions and one or more non-adhesive regions arranged along the longitudinal axis. To form a single-sided tape, the second surface can be non-adhesive or can be provided with a coating to render the second surface non-adhesive. To form a double-sided tape, the second surface can include adhesive and non-adhesive regions that generally correspond to those on the first surface. At least a portion of the first surface non-adhesive regions comprise a series of pull tabs arranged along the longitudinal axis that can be grasped in combination with a second surface non-adhesive region and stretched in the longitudinal direction by a user during stretch removal of the tape from an associated substrate.

STRETCH RELEASING ADHESIVE TAPE WITH INTEGRAL PULL TAB

FIELD OF THE INVENTION

The present invention relates generally to an elongated length of a single or double-sided stretch releasing adhesive tape that can be cut to a selected length with integral pull tabs for stretch removing the tape from a substrate.

BACKGROUND OF THE INVENTION

Stretch releasing adhesive tapes represent an emerging class of high performance pressure-sensitive adhesives combining strong holding power with clean removal and no surface damage. Such stretch releasing adhesive tapes are useful in a wide variety of assembling, joining, attaching, and mounting applications.

Adhesive tape strips that can be cleanly removed from a surface by stretching the tape strip are known in the patented prior art. The Korpman U.S. Pat. No. 4,024,312, for example, discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface. German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

The Kreckel et al. U.S. Pat. No. 5,516,581, assigned to the same assignee as the present invention, discloses a removable adhesive tape having a highly extensible and substantially inelastic backing coated with a layer of pressure sensitive adhesive. The adhesive tape can be removed from a substrate without damaging the substrate by stretching the tape in a direction substantially parallel to the surface of the substrate. The tape backing has a lengthwise elongation at break of from about 150% to about 1200%, a Young's modulus of at least about 2,500 psi to about 72,500 psi, and an elastic recovery of less than about 50% after being stretched and removed. PCT International Publication No. WO 95/06691 discloses a removable foam adhesive tape comprising a backing including a layer of polymeric foam, and a layer of pressure-sensitive adhesive coated on at least one surface of the backing. The foam-layer of the backing has a thickness of about 30 to about 1000 mils, and the backing has a lengthwise elongation at break of from about 50% to about 1200%, and a Young's modulus of less than about 2,400 psi.

Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf AG, Hamburg, Germany. These products are currently manufactured as discrete strips with one end of the strip including a non-adhesive pull tab to facilitate stretching of the strip during removal. The adhesive surfaces of the strip are additionally protected with a release liner.

Desirable for certain applications is an elongated stretch releasing adhesive tape strip of indefinite length which can be formed into a roll or stack from which segments of selected length can be cut depending on the end use application. The difficulty with providing a long length of stretch releasing tape which can be cut to a selected length is the ability to provide a non-adhesive pull tab at a specific location on the cut strip to serve as a grasping area for stretching the strip from a surface at the time of removal.

PCT International Publication No. WO 98/06652 discloses a length cutting fixture which can be used to form a non-adhesive pull tab or "gripper" at the end of a long length of a conventional single-sided adhesive tape. The length cutting fixture also serves to cut the long length of tape, now including the gripper, to any selected length. The gripper is formed by folding the end of the tape back onto itself Such a length cutting fixture, however, cannot be used to form a non-adhesive pull tab on a double-sided adhesive tape.

It is therefore desirable to provide a single or double sided-stretch releasing adhesive tape article in a long length which can be cut into discrete strips having any selected length, wherein each strip can be provided with a non-adhesive pull tab or stretch removal tab that can be grasped and pulled by a user to remove the adhesive tape from a substrate.

BRIEF SUMMARY OF THE INVENTION

The present invention relates generally to an elongated strip of a single or double-sided stretch releasing adhesive tape of indefinite length having one or more integral non-adhesive pull tabs arranged along its length, whereby tape segments each having at least one non-adhesive pull tab for stretch removing the tape segment from a substrate can be cut from the elongated strip. The present stretch releasing adhesive tape invention can be provided as long strips, in roll form, or in a stack. Additionally, the present invention can be used with any known stretch releasing adhesive tape, including a pressure sensitive adhesive tape with an elastic backing, a pressure sensitive adhesive tape with a highly extensible and substantially inelastic backing, or a solid, elastic pressure sensitive adhesive.

The elongated stretch releasing adhesive tape article generally includes an elongate length of stretch releasing adhesive tape defining a longitudinal axis and including first and second surfaces. The first surface comprises one or more adhesive regions and one or more non-adhesive regions arranged along the longitudinal axis. To form a single-sided tape, the second surface can be non-adhesive or can be provided with a coating to render the second surface non-adhesive. To form a double-sided tape, the second surface can include adhesive and non-adhesive regions that generally correspond to those on the first surface. At least a portion of the first surface non-adhesive regions comprise a series of pull tabs arranged along the longitudinal axis that can be grasped in combination with a second surface non-adhesive region and stretched in the longitudinal direction by a user during stretch removal of the tape from an associated substrate.

In one embodiment, the first surface is releasably adhered to the second surface which includes a low adhesion backsize to form a roll or stack of stretch releasing adhesive tape. Alternatively, elongated strips of the stretch releasing adhesive tape can be formed by releasably adhering a liner to the first surface to protect the adhesive thereon. The liner can optionally be stretchable or extensible.

In another embodiment, the one or more non-adhesive regions comprise a plurality of discrete non-adhesive regions arranged along the longitudinal axis. The discrete non-adhesive regions can extend generally perpendicular from the longitudinal axis. In another embodiment, the one or more non-adhesive regions comprise an elongated non-adhesive region arranged generally parallel to the longitudinal axis. In one embodiment, the elongated non-adhesive regions comprise a continuous region. In yet another embodiment, the one or more non-adhesive regions comprise an elongated non-adhesive region generally parallel to a first side edge of the stretch releasing adhesive tape and the one or more adhesive regions comprise an elongated adhesive region generally parallel to a second side edge of the stretch releasing adhesive tape.

In yet another embodiment, the one or more non-adhesive regions comprise an elongated non-adhesive region parallel to the longitudinal axis and interposed between a pair of elongated adhesive regions arranged generally parallel to first and second side edges, respectively, of the stretch releasing adhesive tape. Conversely, the one or more adhesive regions can comprise an elongated adhesive region parallel to the longitudinal axis and interposed between a pair of elongated non-adhesive regions arranged generally parallel to first and second side edges, respectively, of the stretch releasing adhesive tape.

The one or more non-adhesive regions can be one or more gaps in an adhesive defining the adhesive region. Alternatively, the one or more non-adhesive regions can comprise one or more appliques. In one embodiment, the appliques can be arranged intermittently along a continuous adhesive region. In another embodiment, the appliques comprise elongated appliques arranged generally parallel to the longitudinal axis. The appliques can be conventionally known materials or coatings, such as film, paper, powder, foam, ink or a release liner, applied to the tape to render a region non-adhesive. Frangible connections, which serve to define the length of the tape segments and the shape of the pull tabs, can optionally be formed intermittently along the stretch releasing adhesive tape and liner.

In another embodiment, the elongated stretch releasing adhesive tape article includes an elongate length of stretch releasing adhesive tape defining a longitudinal axis. The stretch releasing adhesive tape has first and second opposing surfaces. The first and second surfaces comprise one or more adhesive regions and one or more non-adhesive regions arranged along the longitudinal axis. At least a portion of the non-adhesive regions comprise a series of pull tabs arranged along the longitudinal axis that can be grasped by a user during stretch removal of the tape from an associated substrate. A liner having a first low adhesion surface is releasably bonded to the second adhesive surface.

In one embodiment, the first surface is releasably adhered to a second surface of the liner comprising a roll of stretch releasing adhesive tape. In another embodiment, a liner is releasably adhered to the first surface.

BRIEF DESCRIPTION OF THE SEVERAL VIEWS OF THE DRAWINGS

The present invention will be further described with reference to the accompanying drawings, in which.

DETAILED DESCRIPTION OF THE INVENTION

The present invention relates to various embodiments of a stretch releasing adhesive tape article with integral pull tabs. The stretch releasing adhesive tape of the present invention can be provided in strips of varying lengths, in roll form, or in a stack.

Figure 1:
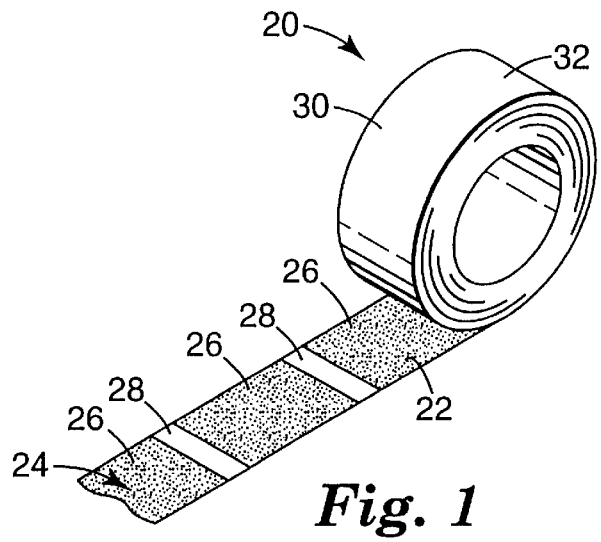
FIG. 1 is a perspective view of a roll of a stretch releasing adhesive tape article.

FIG. 1 is a perspective view of a stretch releasing adhesive tape article 20 in accordance with the present invention. The stretch releasing adhesive tape article 20 includes a stretch releasing adhesive tape 24 having a first surface 22 and a second surface 30. Any conventionally known stretch releasing tape can be used in the various embodiments of the present invention including a pressure sensitive adhesive tape with an elastic backing, a pressure sensitive adhesive tape with a highly extensible and substantially inelastic backing, or a solid, elastic pressure sensitive adhesive. Specific tapes suitable for use in the various embodiments of the present invention include the pressure sensitive adhesive tapes with elastic backings described in U.S. Pat. No. 4,024,312 (Korpman), the pressure sensitive adhesive tapes with highly extensible and substantially inelastic backings described in U.S. Pat. No. 5,516,581 (Kreckel et al.) and PCT International Publication No. WO 95/06691 (Bries et al); and the solid, elastic pressure sensitive adhesive described in German Patent No. 33 31 016. In addition, the stretch releasing adhesive tape of the present invention can include a splittable layer such as the layers described in PCT International Publication No. WO 98/21285, or a re-fastenable layer such as the layers described in PCT International Publication No. WO 99/31193.

First surface 22 of the stretch releasing adhesive tape 24 includes a plurality of adhesive regions 26 and a plurality of non-adhesive regions 28. The adhesive regions 26 of the first surface 22 releasably bond with second surface 30 of the stretch releasing adhesive tape 24 to form roll 32. Various information, such as lines, instructions, or brand indicia may optionally be printed on the first surface 22 or second surface 30.

The second surface 30 of the stretch releasing adhesive tape 24 can be adhesive, adhesive free, can include a low adhesion backsize (LAB), or can include other conventionally known coatings such as film, paper, powder, foam, or ink to render the surface non-adhesive. If second surface 30 is adhesive, first surface 22 or second surface 30 can include a liner to prevent the surfaces from sticking together when the tape is wound upon itself to form a roll or arranged in a stack. Examples of materials suitable for use as liners include kraft papers, polyethylene, polypropylene, polyester or composites of any of these materials which can be coated with release agents such as fluorochemicals or silicone. U.S. Pat. No. 4,472,480 describes low surface energy perfluorochemical liners. The preferred liners are papers, polyolefin films, or polyester films coated with silicone release materials. Examples of the silicone coated release papers are Polyslik trade silicone release papers supplied by James River Co., H. P. Smith Division (Bedford Park, Ill.), and silicone coated papers supplied by Daubert Chemical Co. (Dixon, Ill).

Figure 2A:
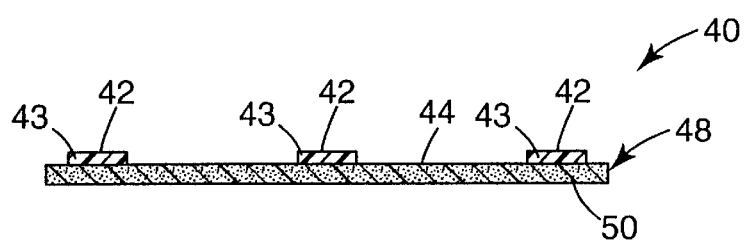
FIG. 2A is a side sectional view of a stretch releasing adhesive tape article having laterally arranged non-adhesive regions in accordance with the present invention.
Figure 2B:
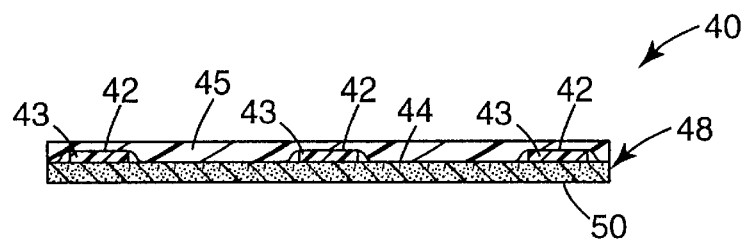
FIG. 2B is a side sectional view of another embodiment of the stretch releasing adhesive tape article of FIG. 2A.
Figure 2C:
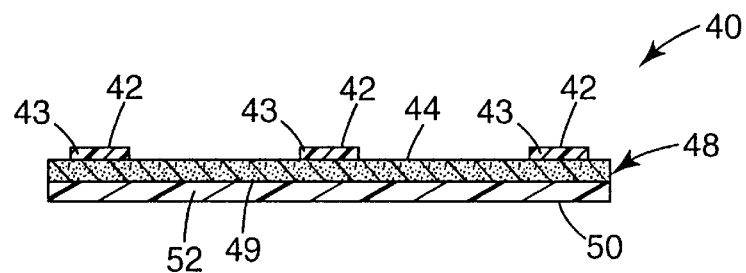
FIG. 2C is a side sectional view of another embodiment of the stretch releasing adhesive tape article of FIG. 2A.

FIGS. 2A–2C are side sectional views of a tape segment cut from various embodiments of a stretch releasing adhesive tape article 40 with laterally extending non-adhesive regions 42. The tape segments can be cut to selected lengths from an elongated strip of indefinite length using conventional cutting means such as scissors or a utility knife. In the embodiments of FIG. 2A–2C, the non-adhesive regions 42 comprises appliques 43 that cover selected portions of the first adhesive surface 44 at a plurality of discrete locations. The appliques 43 can be formed by applying a conventionally known coating such as film, paper, powder, foam, ink, release liner, or other material on the first adhesive surface 44 to render the surface non-adhesive. The concept of the appliques 43 of the present invention can be configured to extend laterally or longitudinally (or some combination thereof) across the adhesive surface 44.

Second surface 50 can be adhesive, adhesive free, can include a low adhesion backsize (LAB), or can include other conventionally known coatings such as film, paper, powder, foam, or ink to render the surface, or a portion thereof, non-adhesive. Where the stretch releasing adhesive tape article 40 is provided in roll form (see FIG. 1), the adhesive surface 44 releasably adheres to non-adhesive second surface 50.

FIG. 2B illustrates an embodiment where the stretch releasing adhesive tape article 40 of FIG. 2A, for which the same reference numerals apply, is provided with a liner 45 bonded to the adhesive surface 44 until the tape article 40 is ready for use.

FIG. 2C illustrates a double-sided tape 48 wherein second surface 49 is adhesive. Liner 52 is releasably bonded to the second adhesive surface 49. The liner 52 may optionally be stretchable to allow a user to grasp a non-adhesive region 42 and the liner 52, and stretch the tape 48 and liner 52 in combination to remove the tape from a substrate. When wound upon itself to form a roll, the non-adhesive surface 50 of the liner 52 is releasably bonded to the first adhesive surface 44. Also contemplated is a stack of tape strips formed such that non-adhesive surface 50 is arranged adjacent and releasebly bonded to first adhesive surface 44. The surface 50 may include a low adhesion coating to facilitate unrolling the stretch releasing adhesive tape 48 from the roll 32 (see FIG. 1). When formed as an elongated strip having an indefinite length, a liner is provided on the first adhesive surface 44, such as the liner 45 illustrated in FIG. 2B.

Figure 3:
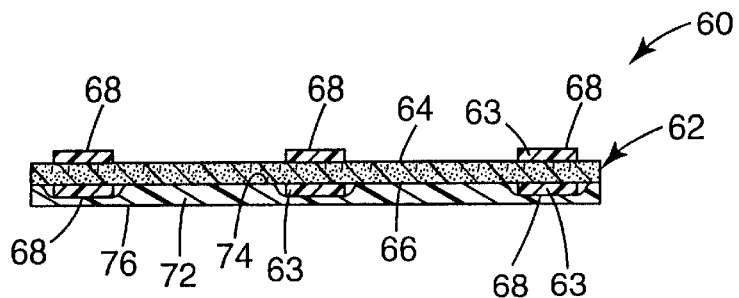
FIG. 3 is a side sectional view of an alternate stretch releasing adhesive tape article having laterally arranged non-adhesive regions in accordance with the present invention.

FIG. 3 is a side sectional view of a tape segment cut from an alternate stretch releasing adhesive tape article 60 in accordance with the present invention. The stretch releasing adhesive tape 62 includes a first adhesive surface 64 and a second adhesive surface 66. Appliques 63 are located on adhesive surfaces 64, 66 to form non-adhesive regions 68. Liner 72 is releasably adhered to the second adhesive surface 66. Alternatively, a liner can be provided on first adhesive surface 64. The liner 72 typically includes a first low adhesion surface 74 engaged with the second adhesive surface 66. For roll applications (see FIG. 1), second low adhesion surface 76 engages first adhesive surface 64. For elongated strip applications, a liner may optionally be provided on the first adhesive surface 64, such as illustrated in FIG. 2B.

The stretch releasing adhesive tape 62 is removed from a substrate by compressively gripping pull tabs formed from a pair of opposing non-adhesive regions 68 and longitudinally stretching the tabs, using the procedure discussed herein. The liner 72 can be removed for double-sided tape applications. The embodiment illustrated in FIG. 3 can also be used for single-sided tape applications by leaving the liner 72 in place. The liner 72 may optionally be stretchable which, for single-sided tape applications, allows the stretch releasing adhesive tape 62 to be removed from a substrate by compressively gripping a non-adhesive region 68 and the second surface 76 of the liner 72, and simultaneously stretching the liner 72 and adhesive tape 62 in the longitudinal direction.

Figure 4:
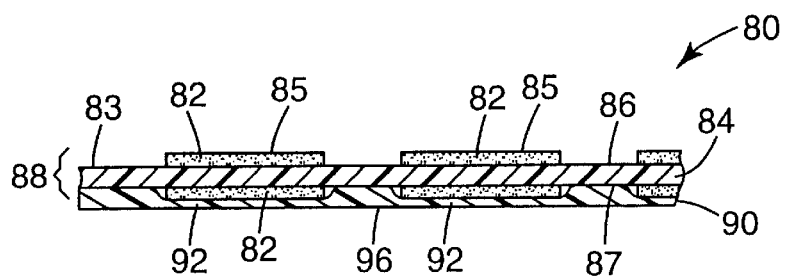
FIG. 4 is a side sectional view of another embodiment of a stretch releasing adhesive tape article having laterally arranged non-adhesive regions in accordance with the present invention.

FIG. 4 is a side sectional view of a tape segment cut from an alternate stretch releasing adhesive tape article 80 in accordance with the present invention. Adhesive 82 is selectively coated onto first surface 83 of a non-adhesive backing 84 so as to create first adhesive regions 85 and first non-adhesive regions 86. Adhesive 82 can be applied to the non-adhesive backing 84 by a variety of techniques, such as pattern coating. For single-sided tape applications, no adhesive is preferably applied to second surface 87.

For double-sided tape applications, adhesive 82 may optionally be selectively coated on the second surface 87 of the non-adhesive backing layer 84. If the double-sided tape is to be used for single-sided tape applications, a liner 90 can be provided on second surface 87, whereby non-adhesive regions 86 in combination with surface 96 of liner 90 can serve as the pull tabs for removing the stretch releasing adhesive tape 88 from a substrate.

In an embodiment in which the adhesive 82 is coated on both surfaces 83, 87 of the backing layer 84 and the tape is wound upon itself to form a roll or is formed into a stack, release liner 90 is releasably adhered to second adhesive regions 92. The first adhesive regions 85 releasably adhere to low adhesion surface 96 on the liner 90 to retain the stretch releasing adhesive tape 88 in roll form (see FIG. 1) or stack form. For elongated strip applications, a separate liner 90 is releasably adhered to the first adhesive regions 85.

Figure 5:
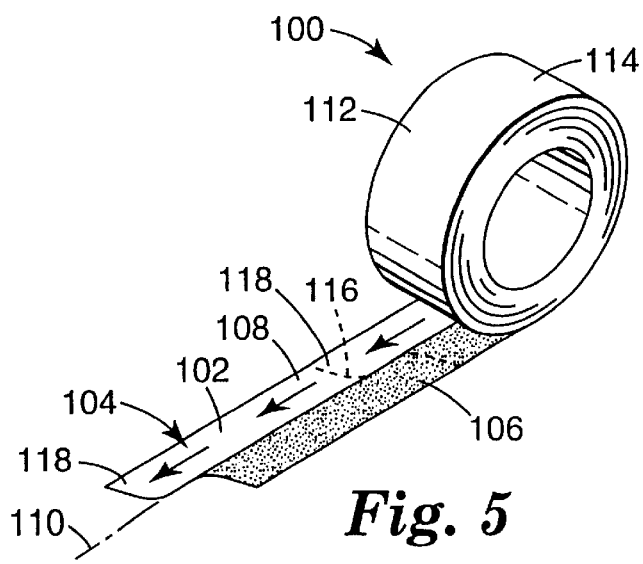
FIG. 5 is a perspective view of a roll of an alternate stretch releasing adhesive tape article.
Figure 6:
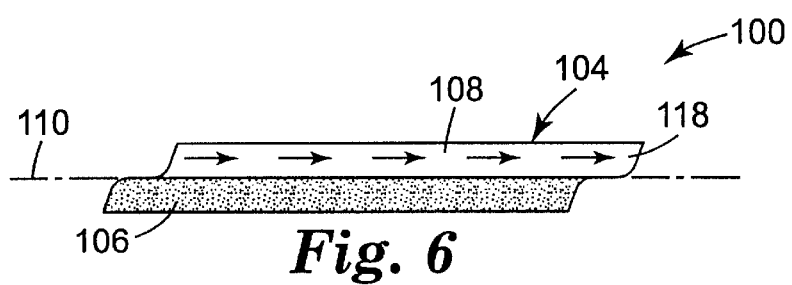
FIG. 6 is a top view of a stretch releasing adhesive tape strip taken from the roll of FIG. 5.

FIGS. 5 and 6 show an alternate stretch releasing adhesive tape article 100 in accordance with the present invention. First surface 102 of the stretch releasing adhesive tape 104 includes an elongated adhesive region 106 and an elongated non-adhesive region 108, both parallel to longitudinal axis 110. Second surface 112 is releasably bonded to adhesive region 106 to form roll 114. The stretch releasing adhesive tape 104 includes a continuous non-adhesive region 108 extending longitudinally along the length of the tape article 100. Continuous, longitudinally extending adhesive region 106 is arranged generally parallel to non-adhesive region 108. For elongated strip applications, a liner 147 (see FIG. 7) may optionally be adhered to first surface 102 and second surface 112 to protect adhesive region 106.

Tape segments can be cut to selected lengths from the roll 114 or from an elongated strip of indefinite length using conventional cutting means such as scissors or a utility knife. The tape can optionally be printed with cut lines (not shown) at selected locations along the length of the tape to indicate the shape to cut the tape to form pull tabs. Tape segments can also be cut to selected lengths using a tool having specially shaped dies which can cut the tape or form perforations into the tape to facilitate the formation of pull tabs 118. Alternatively, frangible regions 116 may be provided along the length of the stretch releasing adhesive tape 104 at selected intervals to facilitate removal of predetermined tape lengths from a long length or roll of tape. Frangible regions 116 may be a perforation, slit, cut, or other line of weakness.

Since the longitudinally extending, non-adhesive region 108 extends along the longitudinal axis 110, the pull tabs 118 can be formed anywhere along the length of the stretch releasing adhesive tape article 100. The frangible regions 116 extend laterally from longitudinal axis 110 and are configured to form contoured pull tabs 118 extending longitudinally beyond adhesive region 106. The contoured pull tabs 118 can be easily gripped by the user, thereby facilitating removal of the stretch releasing adhesive tape 104 from a substrate. The stretch releasing adhesive tape article 100 of FIG. 6 is removed from a substrate by pulling one of the pull tabs 118 generally parallel to the longitudinal axis 110.

Figure 7:
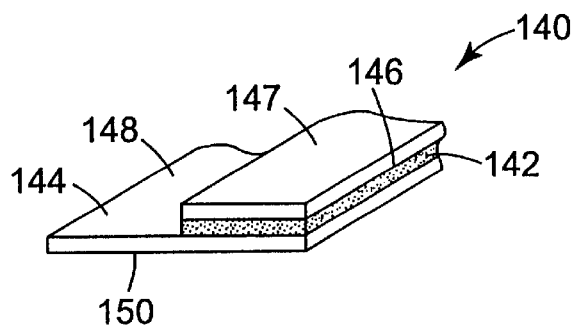
FIG. 7 is a perspective end view of a stretch releasing adhesive tape article having a longitudinally arranged non-adhesive region.

FIG. 7 is a perspective view of one embodiment of a stretch releasing adhesive tape 140, generally depicted in FIGS. 5 and 6. Adhesive layer 142 is coated along a longitudinal portion of first surface 144. The adhesive layer 142 forms adhesive region 146. The uncoated portion of the first surface 144 forms the non-adhesive region 148. For roll applications, second surface 150 releasably adheres to the adhesive region 146 to maintain the roll 114 (see FIG. 5). For elongated strip applications, liner 147 is optionally adhered to the adhesive region 146.

Figure 8A:
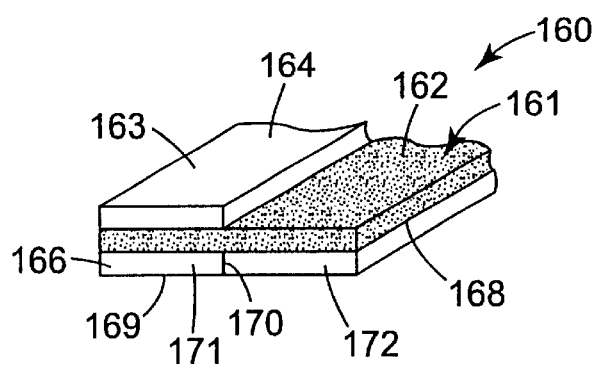
FIG. 8A is a perspective end view of an alternate stretch releasing adhesive tape article having a longitudinally arranged non-adhesive region.

FIG. 8A is a perspective end view of an alternate stretch releasing adhesive tape 160 generally depicted in FIGS. 5 and 6. First surface 162 has adhesive properties. Liner 164 extends across a portion of the first surface 162 to form a continuous, longitudinally extending non-adhesive region 163. The exposed portion of the first surface 162 defines a continuous longitudinally extending adhesive region 161. Liner 166 is positioned along the second adhesive surface 168 of the stretch releasing adhesive tape 160. For roll applications (see FIG. 5), adhesive region 161 releasably attaches to non-adhesive region 169 of the liner 166. Alternatively, liners 164 and 166 can be replaced with appliques to render the associated surfaces non-adhesive.

For double-sided tape applications, the liner 166 is preferably stretchable or extensible and includes a longitudinal slit 170 that allows the portion 172 of the liner 166 to be removed, thereby exposing the second adhesive surface 168. In operation, non-adhesive region 169 of portion 171 and the non-adhesive region 163 form a continuous, longitudinally extending pull tab for compressively gripping the stretch releasing adhesive tape 160 for removal from a substrate. The embodiment of FIG. 8A is particularly useful with stretch releasing adhesive tapes formed of solid, elastic pressure sensitive adhesives such as described in German Patent No. 33 31 016.

Figure 8B:
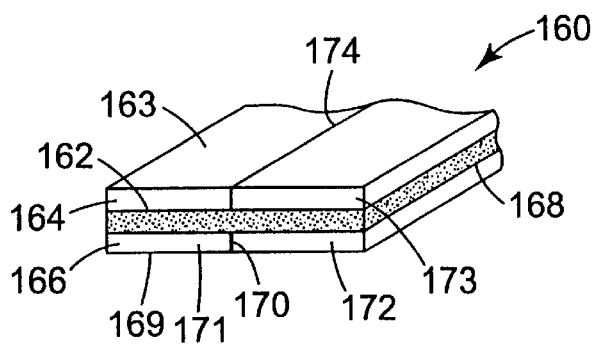
FIG. 8B is a perspective end view of an alternate stretch releasing adhesive tape article of FIG. 8A.

FIG. 8B is a perspective end view of an alternate embodiment of the stretch releasing adhesive tape 160 of FIG. 8A suitable for strip applications. Liner 164 extends across the entire first adhesive surface 162 and liner 166 extends across the second adhesive surface 168. The liner 164 is preferably stretchable or extensible and includes a longitudinal slit 174 that allows a portion 173 of the liner 164 to be removed, thereby exposing the continuous, longitudinally extending first adhesive surface 162. The liner 166, which is also preferably stretchable or extensible, includes a longitudinal slit 170 that allows a portion 172 of the liner 166 opposite liner portion 173 to be removed, thereby exposing a portion of the continuous, longitudinally extending second adhesive surface 168 opposite adhesive surface 162. The non-adhesive regions 163, 169 of the liners 164, 166, respectively, form continuous, longitudinally extending pull tabs.

Figure 9:
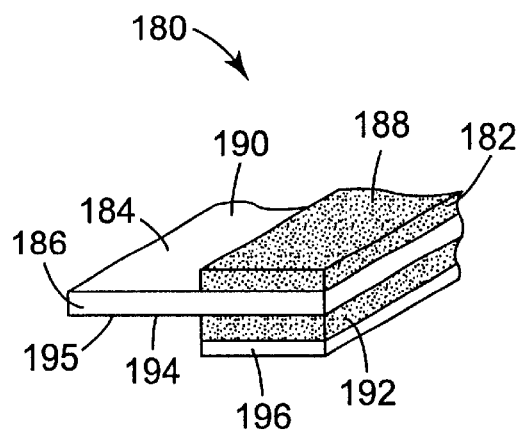
FIG. 9 is a perspective end view of another stretch releasing adhesive tape article with a longitudinally arranged non-adhesive region in accordance with the present invention.

FIG. 9 is a perspective end view of an alternate stretch releasing adhesive tape 180. Continuous adhesive layer 182 is arranged longitudinally on first surface 184 of non-adhesive backing 186. The adhesive layer 182 forms a continuous, longitudinally extending adhesive region 188. The exposed portion of the first surface 184 comprises a continuous, longitudinally extending non-adhesive region 190. A second adhesive layer 192 is positioned longitudinally along the second surface 194. The exposed portion of the second surface 194 comprises longitudinally extending non-adhesive region 195. For roll applications, the adhesive region 188 releasably adheres to liner 196. Release liner 196 facilitates unrolling of the stretch releasing adhesive tape 180 from the roll (see FIG. 5). The non-adhesive regions 190, 195 comprise continuous, longitudinally extending pull tabs.

Figure 10:
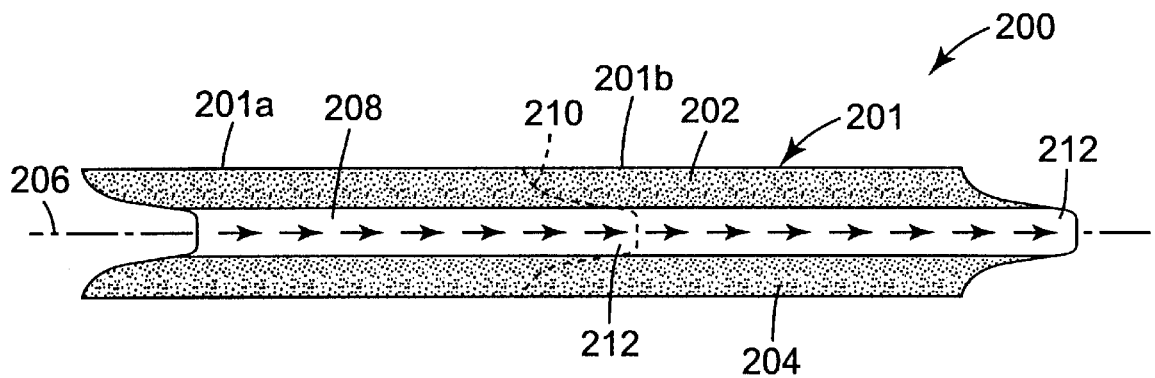
FIG. 10 is a top view of an alternate stretch releasing adhesive tape article having a longitudinally arranged non-adhesive region interposed between a pair of longitudinally arranged adhesive regions.

FIG. 10 is a top view of a section of an alternate stretch releasing adhesive tape article 200 having a pair of longitudinally oriented adhesive regions 202, 204 arranged parallel to longitudinal axis 206. Non-adhesive region 208 is interposed between adhesive regions 202, 204. Perforations 210 are optionally formed into the stretch releasing adhesive tape 201, thereby defining two tape segments 201a, 201b each having a discrete length. The perforations, which can be provided in various patterns or configurations, serve to define pull tabs 212 on each tape segment to facilitate removal. The tape can optionally be printed with cut lines (not shown) at selected locations along the length of the tape to indicate the shape to cut the tape to form pull tabs.

Figure 11:
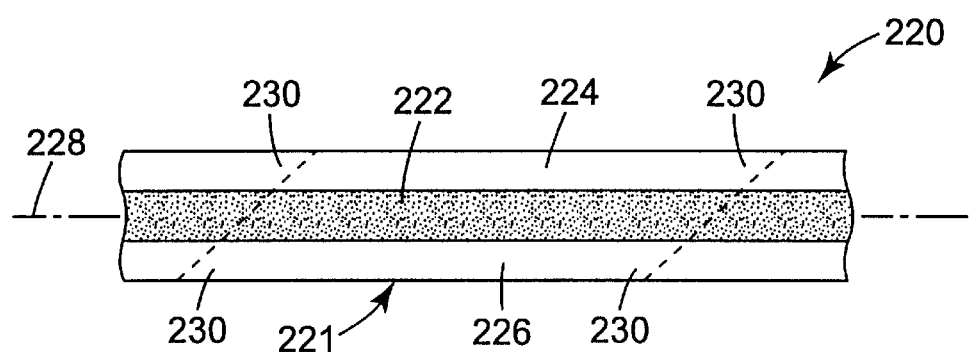
FIG. 11 is a top view of an alternate stretch releasing adhesive tape article having a longitudinally arranged adhesive region interposed between a pair of longitudinally arranged non-adhesive regions.

FIG. 11 is a top view of a section of a stretch releasing adhesive tape article 220 having a longitudinally extending adhesive region 222 interposed between a pair of non-adhesive regions 224, 226, all of which are generally parallel to longitudinal axis 228. In one embodiment, pull tabs 230 are formed by cutting diagonal sections or by providing perforations to form diagonal sections of the stretch releasing adhesive tape 221 from a roll or a length of tape. Consequently, each section of stretch releasing adhesive tape 221 has a pull tab 230 at each end of, and on opposite sides of, the tape segment.

While several embodiments of the invention have been illustrated and described, it will be recognized that various changes and modifications may be made without deviating from the inventive concept set for the above. For example, those skilled in the art will recognize that each embodiment disclosed herein could be modified to form either a single or double-sided tape. In addition, the non-adhesive regions can be formed by pattern coating the tape, thereby leaving portions of the tape adhesive free, by providing appliques, or by using combinations thereof. Any of the single or double-sided tape structures disclosed herein may be used with the stretch releasing adhesive tapes of FIGS. 5 and 6, or 10 and 11. Also, the widths of the various longitudinal adhesive and non-adhesive regions can vary, depending upon the application. The stretch releasing adhesive tape article of FIGS. 10 and 11 can be configured in roll form, in a stack, or as elongated strips of indefinite length. For example, a liner (see generally FIG. 7) can optionally be releasably adhered to the adhesive regions for strip applications.

Any of the features of the various embodiments disclosed herein can be combined. For example, one or more laterally extending non-adhesive regions can be combined with the longitudinally extending non-adhesive regions. Additionally, a segmented release liner, such as disclosed in the commonly assigned U.S. patent application entitled Stretch Releasing Adhesive Tape with Segmented Release Liner, Ser. No. 09/382,177 filed on the same date herewith, can be substituted for the appliques and release liners disclosed herein.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An elongated stretch releasing adhesive tape article that can be adhered to a substrate and subsequently removed by stretching comprising an elongate length of stretch releasing adhesive tape having a longitudinal axis, said stretch releasing adhesive tape having a first surface and a second surface, at least said first surface including at least one adhesive region, and at least one elongated non-adhesive region extending the entire length of said adhesive tape having a longitudinal axis parallel to said adhesive tape longitudinal axis, said non-adhesive region forming a pull tab along an end of said adhesive tape that can be grasped by a user to stretch remove the adhesive tape from an associated substrate.

2. The tape article of claim 1, wherein said at least one adhesive region is an elongated region having a longitudinal axis parallel to said adhesive tape longitudinal axis.

3. The tape article of claim 2, wherein said adhesive region is a single continuous strip extending the entire length of said adhesive tape.

4. The tape article of claim 1, wherein said non-adhesive region comprises an elongated non-adhesive region generally parallel to a first side edge of said stretch releasing adhesive tape and said adhesive region comprises an elongated adhesive region generally parallel to a second side edge of said stretch releasing adhesive tape.

5. The tape article of claim 1, wherein said non-adhesive region comprises an elongated non-adhesive region parallel to said adhesive tape longitudinal axis that is longitudinally interposed between a pair of elongated adhesive regions arranged generally parallel and adjacent to first and second side edges, respectively, of said stretch releasing adhesive tape.

6. The tape article of claim 1, wherein said at least one adhesive region comprises an elongated adhesive region extending the entire length of the adhesive tape parallel to said adhesive tape longitudinal axis and longitudinally interposed between a pair of elongated non-adhesive regions arranged generally parallel and adjacent to first and second side edges, respectively, of said stretch releasing adhesive tape.

7. The tape article of claims 1, wherein said first surface is releasably adhered to said second surface, thereby to form a roll of stretch releasing adhesive tape.

8. The tape article of claim 1, further comprising a liner releasably adhered to said first surface.

9. The tape article of claim 1, wherein said non-adhesive region comprises a gap in an adhesive defining said adhesive regions.

10. The tape article of claim 1, wherein said non-adhesive region comprises an appliques.

11. The tape article of claim 10, wherein said applique comprises one of film, paper, powder, foam, ink, or a release liner.

12. The tape article of claim 10, further comprising frangible connections formed intermittently along said stretch releasing adhesive tape and extending generally laterally from said adhesive tape longitudinal axis.

13. The tape article of claim 1, wherein said non-adhesive region comprises a single elongated non-adhesive region having a width less than the width of said adhesive tape.

* * * * *